(12) United States Patent
Ohara et al.

(10) Patent No.: US 10,416,945 B2
(45) Date of Patent: Sep. 17, 2019

(54) VEHICLE DISPLAY DEVICE

(71) Applicant: NIPPON SEIKI CO., LTD., Niigata (JP)

(72) Inventors: Yusuke Ohara, Niigata (JP); Yutaka Kaneko, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 16/094,738

(22) PCT Filed: Apr. 13, 2017

(86) PCT No.: PCT/JP2017/015130
§ 371 (c)(1),
(2) Date: Oct. 18, 2018

(87) PCT Pub. No.: WO2017/183555
PCT Pub. Date: Oct. 26, 2017

(65) Prior Publication Data
US 2019/0107986 A1    Apr. 11, 2019

(30) Foreign Application Priority Data

Apr. 19, 2016  (JP) ................... 2016-083607

(51) Int. Cl.
*G06F 3/14* (2006.01)
*B60R 11/02* (2006.01)
(Continued)

(52) U.S. Cl.
CPC ............... *G06F 3/14* (2013.01); *B60K 35/00* (2013.01); *B60R 11/02* (2013.01); *B60R 16/02* (2013.01);
(Continued)

(58) Field of Classification Search
CPC .... G06F 3/14; G06F 13/4022; G06F 13/4282; B06K 35/00; B60K 35/00; B60R 11/02; B60R 16/02
See application file for complete search history.

(56) References Cited

U.S. PATENT DOCUMENTS

2004/0139369 A1   7/2004  Kirschner
2010/0150338 A1*  6/2010  Nguyen .............. G06F 13/4291
                                          379/412
(Continued)

FOREIGN PATENT DOCUMENTS

JP    2004-191089 A    7/2004
JP    2004-533070 A   10/2004
(Continued)

OTHER PUBLICATIONS

International Search Report issued in corresponding International Patent Application No. PCT/JP2017/015130, dated Jul. 4, 2017, with English Translation.

*Primary Examiner* — Glenn A. Auve
*Assistant Examiner* — Phong H Dang
(74) *Attorney, Agent, or Firm* — McDermott Will & Emery LLP (57) ABSTRACT

Provided is a vehicle display device such that the responsiveness of communication between a main microcomputer and a sub microcomputer is improved. The vehicle display device is equipped with a main microcomputer that generates information data and a sub microcomputer that generates an image to be displayed on a display element on the basis of the information data. Between the main microcomputer and the sub microcomputer, at least a signal line for data transmission and a signal line for chip select signal transmission are connected so as to allow communication between the main microcomputer and the sub microcomputer. The vehicle display device synchronizes a first timer counter counted by the main microcomputer and a second timer counter counted by the sub microcomputer, in response to the tip select signal transmitted to the sub microcomputer by the main microcomputer.

11 Claims, 4 Drawing Sheets

(51) Int. Cl.
   *B60R 16/02*   (2006.01)
   *B60K 35/00*   (2006.01)
   *G06F 13/40*   (2006.01)
   *G06F 13/42*   (2006.01)

(52) U.S. Cl.
   CPC ...... *G06F 13/4022* (2013.01); *G06F 13/4282* (2013.01); *B60K 2370/52* (2019.05)

(56) References Cited

U.S. PATENT DOCUMENTS

| | | | |
|---|---|---|---|
| 2012/0207205 A1* | 8/2012 | Zhao | H05B 33/0827 375/238 |
| 2013/0246831 A1* | 9/2013 | Yuzawa | G06F 1/12 713/400 |
| 2013/0278312 A1* | 10/2013 | Getzin | G06F 1/10 327/160 |
| 2015/0199068 A1* | 7/2015 | Arima | G06F 3/0412 345/173 |
| 2016/0027146 A1 | 1/2016 | Klim et al. | |
| 2016/0049894 A1* | 2/2016 | Burke | H02P 25/22 318/496 |
| 2016/0064057 A1* | 3/2016 | Lee | G11C 8/18 365/230.08 |
| 2017/0041897 A1* | 2/2017 | Pitigoi-Aron | H04W 56/0045 |

FOREIGN PATENT DOCUMENTS

| | | |
|---|---|---|
| JP | 2008-189211 A | 8/2008 |
| JP | 2014-025792 A | 2/2014 |
| JP | 2016-024466 A | 2/2016 |

\* cited by examiner

FIG4

VEHICLE DISPLAY DEVICE

CROSS REFERENCE

This application is the U.S. National Phase under 35 U.S.C. § 371 of International Application No. PCT/JP2017/015130, filed on Apr. 13, 2017, which claims the benefit of Japanese Application No. 2016-083607, filed on Apr. 19, 2016, the entire contents of each are hereby incorporated by reference.

TECHNICAL FIELD

The present invention relates to a vehicle display device. The invention specifically relates to a vehicle display device that improves the responsiveness of communication between a main microcomputer and a sub microcomputer.

BACKGROUND ART

Some vehicle display devices are equipped with a display such as a liquid crystal display, and display an image indicating information such as a vehicle speed on the display. For example, PTL 1 discloses a vehicle display device equipped with a microcomputer (main microcomputer) in charge of overall control of the vehicle display device, and a liquid crystal display including a TFT that displays an image thereon and a GDC (sub microcomputer) that causes the TFT to display the image.

In the vehicle display device as disclosed in PTL 1, communication is executed between a main microcomputer and the sub microcomputer, and a sub microcomputer generates an image on the basis of data received from the main microcomputer, and causes the TFT to display the image. In the vehicle display device as disclosed in PTL 1, it is assumed that the main microcomputer transmits data representing the vehicle speed for every predetermined time (for example, 10 msec) to the sub microcomputer, and the sub microcomputer reads out data stored in a reception buffer of the sub microcomputer for every predetermined time (for example, 10 msec) and generates an image on the basis of the data.

Meanwhile, the present inventors have recognized that a main microcomputer executes a transmission process on the basis of an own timer counter for every predetermined time, and a sub microcomputer executes a read-out process (reception process) on the basis of an own timer counter for every predetermined time. Accordingly, the present inventors have recognized that a dedicated signal line is added between the main microcomputer and the sub microcomputer to synchronize the timer counter of the main microcomputer and the timer counter of the sub microcomputer, so that the responsiveness of communication between the main microcomputer and the sub microcomputer can be improved. However, the present inventors have recognized that the cost is increased when a dedicated signal line is added between the main microcomputer and the sub microcomputer.

CITATION LIST

Patent Literature

PTL 1: JP-A-2014-025792

SUMMARY OF INVENTION

One object of the invention is to provide a vehicle display device that improves the responsiveness of communication between a main microcomputer and a sub microcomputer. Another object of the invention will be apparent for persons skilled in the art with reference to the aspects, the preferred embodiment, and the attached drawings, which are exemplified below.

A first aspect according to the invention relates to a vehicle display device including: a main microcomputer that generates information data; and a sub microcomputer that generates an image to be displayed on a display element on the basis of the information data, in which at least a signal line through which the main microcomputer transmits the information data to the sub microcomputer, and separately from this signal line, a signal line through which the main microcomputer transmits a chip select signal that is a signal for selecting a transmission destination of the information data, are connected between the main microcomputer and the sub microcomputer so that communication is executable between the main microcomputer and the sub microcomputer, the main microcomputer executes a transmission process of transmitting the information data to the sub microcomputer on the basis of a first timer counter that is a timer counter counted by the main microcomputer for every predetermined time, the sub microcomputer executes a reception process of the information data on the basis of a second timer counter that is a timer counter counted by the sub microcomputer for the every predetermined time, the main microcomputer executes, when a count value of the first timer counter becomes a prescribed value, either one of switching from a Lo level to a Hi level or switching from the Hi level to the Lo level of the chip select signal to be transmitted to the sub microcomputer, and the first timer counter and the second timer counter are synchronized in accordance with either the one of the switching from the Lo level to the Hi level or the switching from the Hi level to the Lo level of the chip select signal being executed.

In the vehicle display device of the first aspect, a chip select signal transmitted by the main microcomputer to the sub microcomputer is used to synchronize the first timer counter of the main microcomputer and the second timer counter of the sub microcomputer. Accordingly, for example, no dedicated signal line is required to be added for synchronizing the first timer counter and the second timer counter.

With a second aspect according to the invention, in the first aspect, the sub microcomputer may determine, when either the one of the switching from the Lo level to the Hi level or the switching from the Hi level to the Lo level of the chip select signal is executed, whether a count value of the second timer counter matches the count value of the first timer counter, and the sub microcomputer may count, when determining that the count value of the second timer counter does not match the count value of the first timer counter, the count value of the second timer counter by one more or by one less.

In the second aspect, in the state where the first timer counter and the second timer counter are not synchronized, the count value of the second timer counter is counted by one more or by one less, so that an influence on operations other than the reception process by the sub microcomputer is considered.

With a third aspect according to the invention, in the second aspect, the sub microcomputer may count, when determining that the count value of the second timer counter does not match the count value of the first timer counter, the count value of the second timer counter by one more or by one less so as to approach the count value of the first timer counter.

In the third aspect, in the state where the first timer counter and the second timer counter are not synchronized, the count value of the second timer counter is caused to approach the count value of the first timer counter one by one, so that an influence on operations other than the reception process by the sub microcomputer is considered, and the first timer counter and the second timer counter can be synchronized earlier.

With a fourth aspect according to the invention, in the first aspect, the sub microcomputer may determine, when either the one of the switching from the Lo level to the Hi level or the switching from the Hi level to the Lo level of the chip select signal is executed, whether the count value of the second timer counter matches the count value of the first timer counter, and the sub microcomputer may cause, when determining that the count value of the second timer counter does not match the count value of the first timer counter, the count value of the second timer counter to instantly match the count value of the first timer counter.

In the fourth aspect, in the state where the first timer counter and the second timer counter are not synchronized, the count value of the second timer counter is caused to instantly match the count value of the first timer counter, so that the first timer counter and the second timer counter can be synchronized earlier.

With a fifth aspect according to the invention, in the first to fourth aspects, the communication between the main microcomputer and the sub microcomputer is communication by a serial peripheral interface (SPI) communication method.

In the fifth aspect, it is possible to synchronize the first timer counter and the second timer counter using the chip select signal by the SPI communication method.

DESCRIPTION OF EMBODIMENT

A preferred embodiment described below is used for easy understanding of the invention. Accordingly, persons skilled in the art should be noted that the invention is not unduly limited by the embodiment described below.

An example of a configuration of a vehicle display device 10 according to the invention will be described using FIG. 1. The vehicle display device 10 is equipped with a main microcomputer 20, a sub microcomputer 30, and a display element 40. The vehicle display device 10 is connected to a communication line 50 of a vehicle-mounted network such as a CAN via an input-output port 25 of the main microcomputer 20.

The vehicle display device 10 is an indicating instrument for a vehicle that can generate an image indicating vehicle information such as the vehicle speed that is received from a not-illustrated sensor or the like connected to the communication line 50, and can display the image on the display element 40 such as a liquid crystal panel. The vehicle display device 10 is not required to display all the vehicle information with the display element 40, but may provide the vehicle information to a driver together with a not-illustrated pointer indicator and the like.

The main microcomputer 20 is a microcomputer (microcomputer) that is in charge of overall control of the vehicle display device 10, and is equipped with a processing unit 21 including a central processing unit (CPU) and the like, a first timer counter 22, a storage unit 23 including a random access memory (RAM), a read only memory (ROM), and the like, an SPI communication unit 24 that allows communication by a serial peripheral interface (SPI) communication method, and the input-output port 25.

The main microcomputer 20 operates in synchronization with a clock signal that is input thereto from a not-illustrated external oscillation circuit. Moreover, alternatively, the main microcomputer 20 may be internally equipped with an oscillation circuit, and oscillate a clock signal.

The sub microcomputer 30 is, for example, a graphic display controller (GDC) that causes the display element 40 to display an image, and is equipped with a processing unit 31 including a CPU and the like, a second timer counter 32, a storage unit 33 including a RAM, a ROM, and the like, an SPI communication unit 34 that allows communication by the SPI communication method, and an input-output port 35. The sub microcomputer 30 operates in synchronization with a clock signal that is input thereto from the main microcomputer 20 via the SPI communication unit 34.

The SPI communication unit 24 of the main microcomputer 20 and the SPI communication unit 34 of the sub microcomputer 30 are connected to each other to make it possible to execute communication between the main microcomputer 20 and the sub microcomputer 30 by the SPI communication method. In other words, a clock signal is transmitted from a serial clock (SCLK) terminal in the SPI communication unit 24 of the main microcomputer 20 serving as a master in the communication by the SPI communication method to an SCLK terminal in the SPI communication unit 34 of the sub microcomputer 30 serving as a slave in the communication by the SPI communication method. Moreover, data is transmitted from a master-out slave-in (MOSI) terminal in the SPI communication unit 24 of the main microcomputer 20 to an MOSI terminal in the SPI communication unit 34 of the sub microcomputer 30. Moreover, data is transmitted from a master-in slave-out (MISO) terminal in the SPI communication unit 34 of the sub microcomputer 30 to an MISO terminal in the SPI communication unit 24 of the main microcomputer 20. In addition, a chip select signal is transmitted from a chip select (CS) terminal in the SPI communication unit 24 of the main microcomputer 20 to a slave select (SS) terminal in the SPI communication unit 34 of the sub microcomputer 30.

When a chip select signal that is transmitted from the main microcomputer 20 to the sub microcomputer 30 is at a Lo level, the sub microcomputer 30 can receive data that is transmitted from the main microcomputer 20. The SPI communication unit 24 of the main microcomputer 20 and the SPI communication unit 34 of the sub microcomputer 30 may be configured as hardware, or may be configured as software.

The main microcomputer 20 receives vehicle information from the not-illustrated sensor or the like connected to the communication line 50, and generates information data including the vehicle information. Examples of the vehicle information include the vehicle speed, the engine speed, the water temperature, the remaining quantity of fuel, the presence of a vehicle at the front, an operation state and the like of a safety device such as an antiskid brake system, and the like. The main microcomputer 20 stores the generated information data in a transmission buffer of the main microcomputer 20. The transmission buffer of the main microcomputer 20 may be configured to include a part of the storage unit 23, for example.

The main microcomputer 20 executes a transmission process of transmitting information data stored in the transmission buffer to the sub microcomputer 30 on the basis of the first timer counter 22 counted by the main microcomputer 20 itself, for every predetermined time. The first timer counter 22 counts up or counts down a count value in synchronization with a clock signal, and when the count value matches a set value, notifies the processing unit 21 and resets the count value. In other words, the first timer counter 22 can conduct the measurement repeatedly during predetermined time that is determined from an initial value of the count value and a value to be set. The predetermined time is, for example, 10 ms.

The information data transmitted from the main microcomputer 20 is stored in a reception buffer of the sub microcomputer 30. The reception buffer of the sub microcomputer 30 may be configured to include a part of the storage unit 33, for example.

The sub microcomputer 30 executes a reception process of reading out information data stored in the reception buffer on the basis of the second timer counter 32 counted by the sub microcomputer 30 itself, for every predetermined time. The second timer counter 32 counts up or counts down a count value in synchronization with a clock signal, and when the count value matches a set value, notifies the processing unit 31 and resets the count value. In other words, the second timer counter 32 can conduct the measurement repeatedly during predetermined time that is determined from an initial value of the count value and a value to be set. The predetermined time related to the reception process is preferably the same length as the predetermined time related to the transmission process.

The sub microcomputer 30 generates an image to be displayed on the display element 40 on the basis of the information data read out from the reception buffer. The sub microcomputer 30 outputs the generated image to the display element 40 via the input-output port 35, and the display element 40 displays the input image. For example, when the received information data includes a vehicle speed, the sub microcomputer 30 generates an image including an image element indicating the vehicle speed, and causes the display element 40 to display the image. As a result, a driver can grasp the vehicle speed by visually identifying the image displayed on the display element 40. Here, in the example illustrated in FIG. 1, the main microcomputer 20 receives the vehicle information via the communication line 50, but naturally may receive the vehicle information from a sensor or the like that is directly connected to the main microcomputer 20.

In the vehicle display device 10, the main microcomputer 20 executes the transmission process on the basis of the first timer counter 22 for every predetermined time, and the sub microcomputer 30 executes the reception process on the basis of the second timer counter 32 for every predetermined time. Accordingly, even when the predetermined time that is measured by the first timer counter 22 and the predetermined time that is measured by the second timer counter 32 have the same length, the timing when the main microcomputer 20 executes the transmission process differs from the timing when the sub microcomputer 30 executes the reception process in some cases. For example, in a case where the timing when the first timer counter 22 starts and the timing when the second timer counter 32 starts to count up or count down differ from each other or other cases, the timing when the main microcomputer 20 executes the transmission process differs from the timing when the sub microcomputer 30 executes the reception process.

Moreover, the timing when the main microcomputer 20 executes the transmission process differs from the timing when the sub microcomputer 30 executes the reception process due to different operation modes between the main microcomputer 20 and the sub microcomputer 30 in some cases. As a specific example, no operating system (OS) is mounted on the main microcomputer 20, so that priorities of a plurality of processes are not considered and each of the processes is executed for every set time. Accordingly, the transmission process by the main microcomputer 20 is reliably executed for every predetermined time.

In contrast to this, the OS (what is called real-time OS) is mounted on the sub microcomputer 30, so that on the basis of the scheduling in which priorities of a plurality of processes are considered by the OS, the respective processes are executed, for example, in descending order of priority. Accordingly, a process with a low priority may be executed with an interval longer than the set time.

Here, the processes executed by the sub microcomputer 30 include, at least, the reception process, and a process (display process) that causes the display element 40 to execute displaying on the basis of information data, and the reception process is executed on the basis of the second timer counter 32 for every predetermined time and the display process is executed on the basis of a not-illustrated another timer counter of the sub microcomputer 30 for every predetermined time. For example, the predetermined time during when the display process is executed differs from the predetermined time during when the reception process is executed, so that when the priority of the display process is higher than the priority of the reception process, a status where the reception process is not executed for predetermined time (for example, 10 ms) may occur.

For example, it is assumed that a dedicated signal line is further added between the main microcomputer 20 and the sub microcomputer 30 to synchronize the first timer counter 22 and the second timer counter 32, so that it is possible to prevent the timing when the main microcomputer 20 executes the transmission process and the timing when the sub microcomputer 30 executes the reception process from differing from each other. However, it is assumed that if the dedicated signal line is further added between the main microcomputer 20 and the sub microcomputer 30, a manufacturing cost of the vehicle display device 10 as a whole increases.

Here, in communication by the SPI communication method, when a plurality of slaves is connected to one master, the master can select the slave to be communicated with a chip select signal. In other words, only the slave that receives a chip select signal at a Lo level can transmit and receive data with the master.

Figure 1:
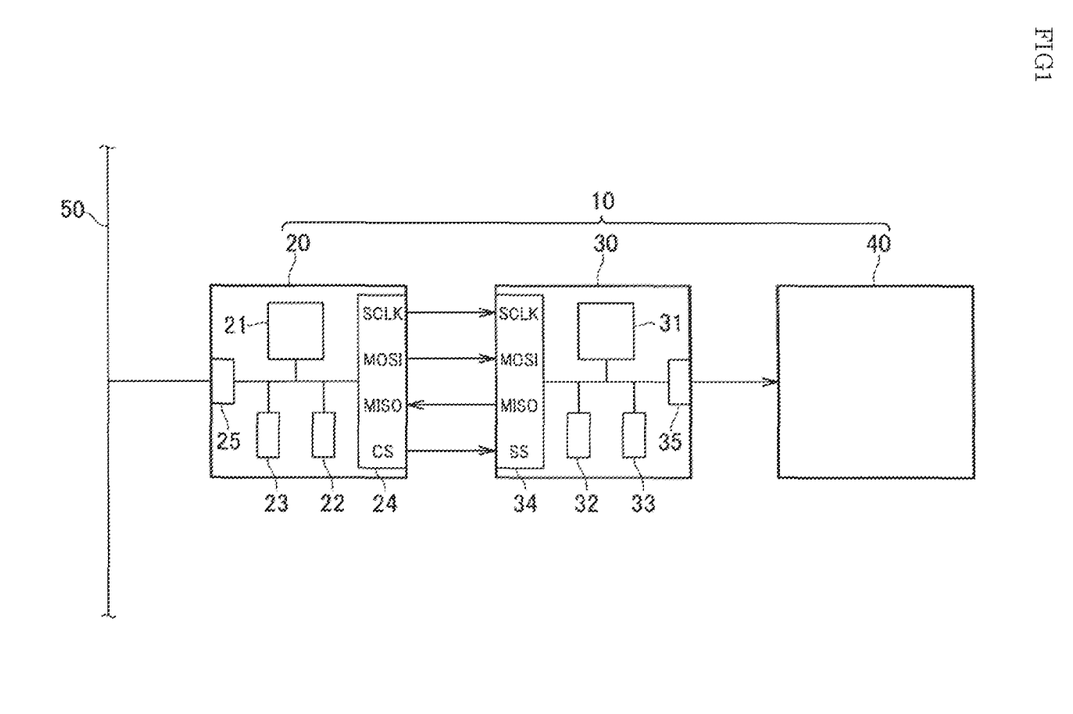
FIG. 1 is a block diagram illustrating an example of a configuration of a vehicle display device according to the invention.

Meanwhile, as illustrated in FIG. 1, a slave that is connected to the main microcomputer 20 serving as a master in the vehicle display device 10 is only the sub microcomputer 30. Accordingly, in the vehicle display device 10, for the purpose of establishing communication between the main microcomputer 20 and the sub microcomputer 30, a chip select signal that is transmitted from the main microcomputer 20 to the sub microcomputer 30 is not required to be switched from the Lo level to the Hi level.

By using this, in the vehicle display device 10, in response to a chip select signal that is transmitted from the main microcomputer 20 to the sub microcomputer 30, the first timer counter 22 of the main microcomputer 20 and the second timer counter 32 of the sub microcomputer 30 are synchronized. In other words, in the vehicle display device 10, when a chip select signal is changed from a Lo level to a Hi level or when a chip select signal is changed from the Hi level to the Lo level, the first timer counter 22 of the main microcomputer 20 and the second timer counter 32 of the sub microcomputer 30 are synchronized.

Figure 2:
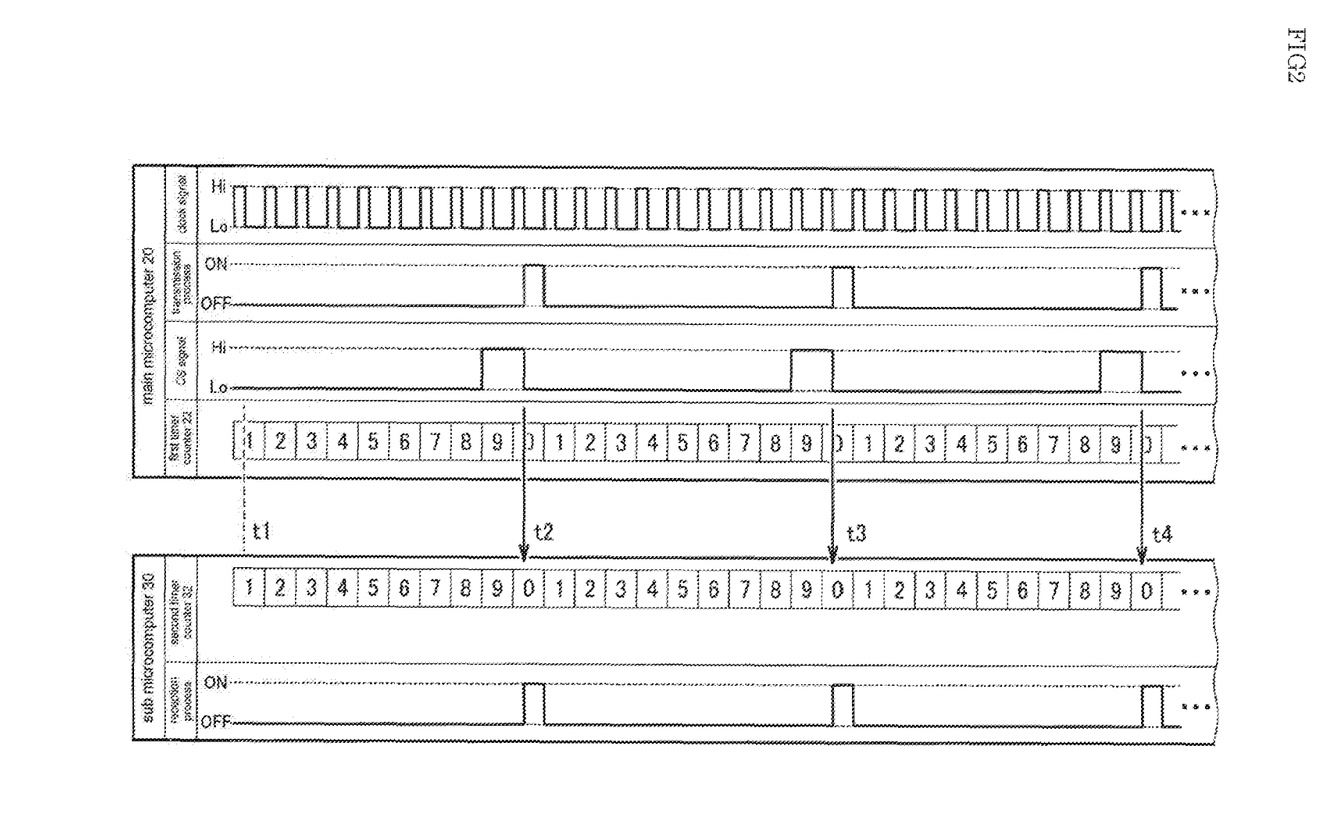
FIG. 2 is a time chart illustrating a relation between a transmission process by a main microcomputer and a reception process by a sub microcomputer, illustrated in FIG. 1.

FIG. 2 illustrates a time chart illustrating a relation between the transmission process by the main microcomputer 20 and the reception process by the sub microcomputer 30. FIG. 2 illustrates a pulse waveform of a clock signal, whether the transmission process is ON or OFF, whether a chip select signal is at a Hi level or a Lo level, and a count value of the first timer counter 22, as operations in the main microcomputer 20, and a count value of the second timer counter 32 and whether the reception process is ON or OFF, as operations in the sub microcomputer 30. In the example illustrated in FIG. 2, the first timer counter 22 of the main microcomputer 20 and the second timer counter 32 of the sub microcomputer 30 are in a synchronized state at a time point t1.

The first timer counter 22 and the second timer counter 32 respectively count up counter values for every one cycle of a clock signal. The main microcomputer 20 executes the transmission process when the count value of the first timer counter 22 becomes 0. Similarly, the sub microcomputer 30 executes the reception process when the count value of the second timer counter 32 becomes 0.

In the example illustrated in FIG. 2, one cycle of the clock signal is 1 ms. In other words, in the example illustrated in FIG. 2, the transmission process by the main microcomputer 20 is executed for every 10 ms, and the reception process by the sub microcomputer 30 is also executed for every 10 ms.

The main microcomputer 20 switches a chip select signal from a Lo level to a Hi level when the count value of the first timer counter 22 becomes a prescribed value (9 in the example illustrated in FIG. 2). Thereafter, the main microcomputer 20 switches the chip select signal from the Hi level to the Lo level when the count value of the first timer counter 22 becomes a prescribed value (0 in the example illustrated in FIG. 2).

In the example illustrated in FIG. 2, when the chip select signal that is transmitted from the main microcomputer 20 is switched from the Hi level to the Lo level (a time point t2), the count value of the second timer counter 32 is 0, which is the same as the count value of the first timer counter 22. Moreover, in the example illustrated in FIG. 2, when the chip select signal that is transmitted from the main microcomputer 20 is thereafter switched from the Hi level to the Lo level (a time point t3 and a time point t4), both of the count value of the second timer counter 32 and the count value of the first timer counter 22 are 0.

In other words, in the example illustrated in FIG. 2, as described above, the first timer counter 22 and the second timer counter 32 are synchronized, and the timing when the main microcomputer 20 executes the transmission process and the timing when the sub microcomputer 30 executes the reception process are simultaneous with each other. In this manner, the responsiveness of the reception process by the sub microcomputer 30 with respect to the transmission process by the main microcomputer 20 is higher when the first timer counter 22 and the second timer counter 32 are synchronized than when the first timer counter 22 and the second timer counter 32 are not synchronized. As a result, an interval of time from when the main microcomputer 20 transmits information data to when an image to which this information data is reflected is displayed on the display element 40 is reduced.

Hereinafter, with reference to FIG. 3 and FIG. 4, an example of an operation of the vehicle display device 10 in a state where the first timer counter 22 of the main microcomputer 20 and the second timer counter 32 of the sub microcomputer 30 are not synchronized will be described. Firstly, with reference to FIG. 3, one example of the operation of the vehicle display device 10 in the state where the first timer counter 22 of the main microcomputer 20 and the second timer counter 32 of the sub microcomputer 30 are not synchronized will be described. Herein, an operation in which a count-up is omitted once such that the count value of the second timer counter 32 is delayed by one in response to the chip select signal when the first timer counter 22 of the main microcomputer 20 and the second timer counter 32 of the sub microcomputer 30 are not synchronized will be described.

Figure 3:
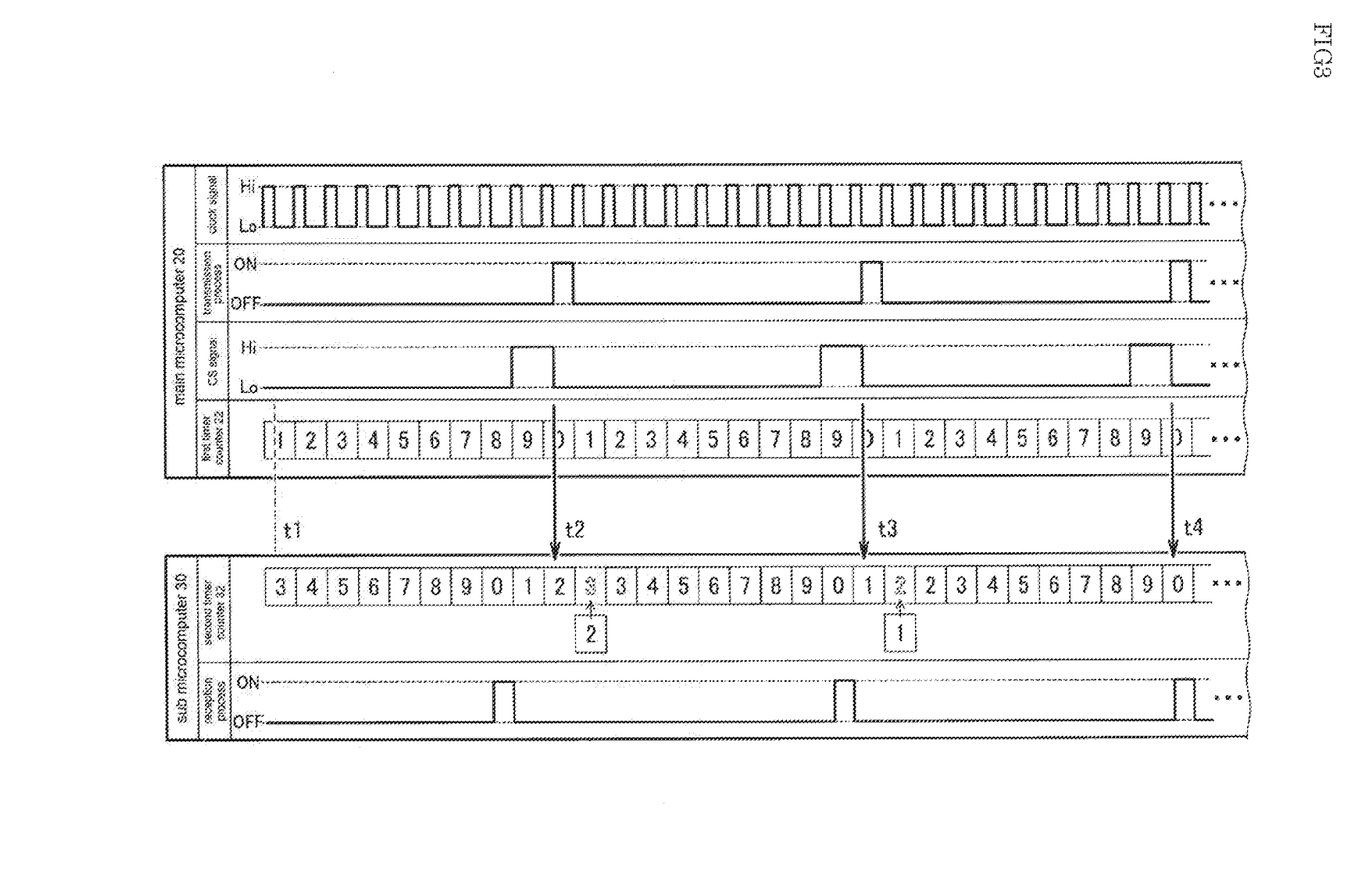
FIG. 3 is a time chart illustrating a relation between the transmission process by the main microcomputer and the reception process by the sub microcomputer, illustrated in FIG. 1.

The example illustrated in FIG. 3 indicates a state where, at the time point t1, the count value of the second timer counter 32 is proceeded two forward from the count value of the first timer counter 22. In other words, if no measure is taken, the sub microcomputer 30 executes each reception process at the timing earlier by 2 ms than the timing when the main microcomputer 20 executes each transmission process.

Therefore, the sub microcomputer 30 determines whether the count value of the second timer counter 32 is 0 when the chip select signal that is transmitted from the main microcomputer 20 is switched from the Hi level to the Lo level. If determining that the count value of the second timer counter 32 is not 0, the sub microcomputer 30 omits a next count-up once such that the count value of the second timer counter 32 is delayed by one. On the other hand, if determining that the count value of the second timer counter 32 is 0, the sub microcomputer 30 normally counts up by one at the timing of a next count-up.

Specifically, in the example illustrated in FIG. 3, at the time point t2 when the chip select signal that is transmitted from the main microcomputer 20 is switched from the Hi level to the Lo level, the count value of the second timer counter 32 is 2. Accordingly, the sub microcomputer 30 omits a next count-up once. In other words, the count value of the second timer counter 32 that is 2 at the time point t2 does not become 3 but remains 2 at next count-up timing. Further, the count value of the second timer counter 32 is counted up by one from count-up timing that is twice later from the time point t2.

Moreover, in the example illustrated in FIG. 3, at the time point t3 when the chip select signal that is transmitted from the main microcomputer 20 is switched from the Hi level to the Lo level, the count value of the second timer counter 32 is 1. Accordingly, the sub microcomputer 30 omits a next count-up once. In other words, the count value of the second timer counter 32 that is 1 at the time point t3 does not become 2 but remains 1 at next count-up timing. Further, the count value of the second timer counter 32 is counted up by one from count-up timing that is twice later from the time point t3.

In addition, in the example illustrated in FIG. 3, at the time point t4 when the chip select signal that is transmitted from the main microcomputer 20 is switched from the Hi level to the Lo level, the count value of the second timer counter 32 is 0. Accordingly, the sub microcomputer 30 normally counts up at next count-up timing. In other words, at the time point t4, the first timer counter 22 of the main microcomputer 20 and the second timer counter 32 of the sub microcomputer 30 are synchronized.

Subsequently, firstly, with reference to FIG. 4, another example of the operation of the vehicle display device 10 in the state where the first timer counter 22 of the main microcomputer 20 and the second timer counter 32 of the sub microcomputer 30 are not synchronized will be described. Herein, an operation in which a count-up is performed one time more such that the count value of the second timer counter 32 is advanced by one in response to the chip select signal when the first timer counter 22 of the main microcomputer 20 and the second timer counter 32 of the sub microcomputer 30 are not synchronized will be described.

Figure 4:
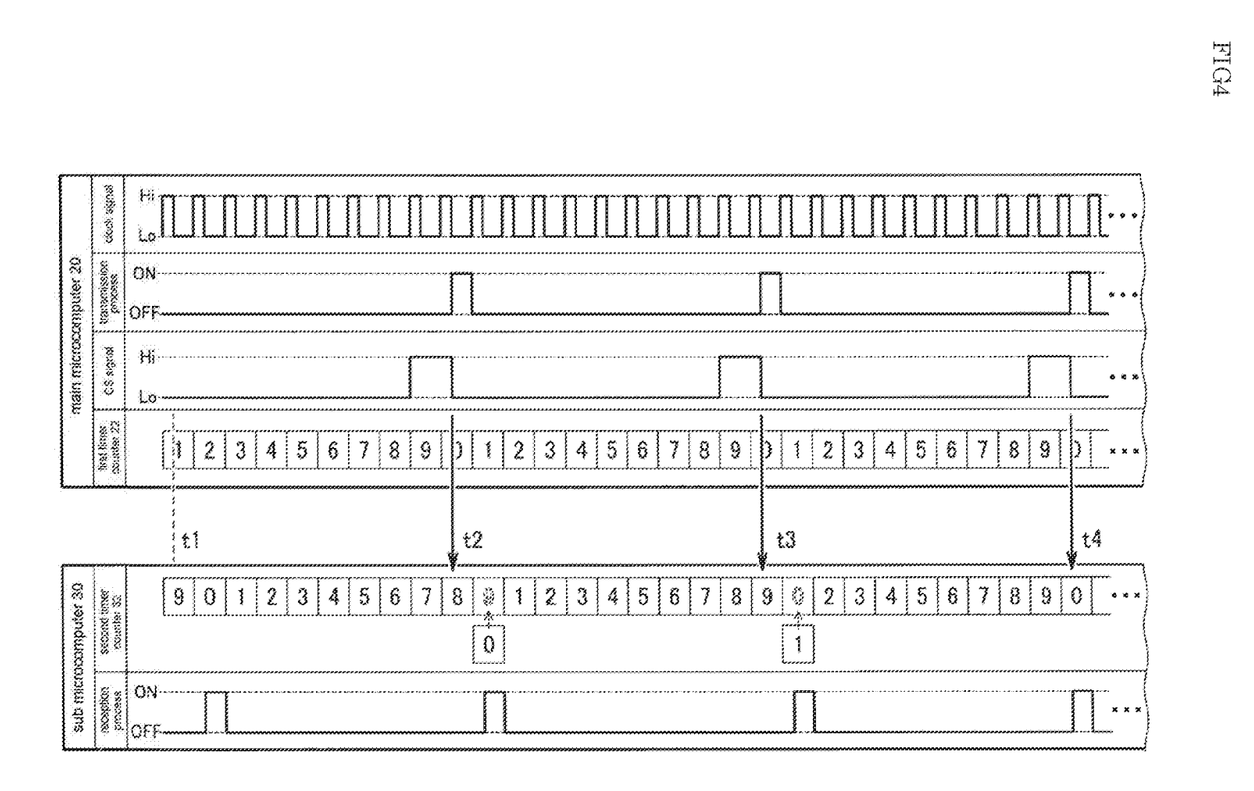
FIG. 4 is a time chart illustrating a relation between the transmission process by the main microcomputer and the reception process by the sub microcomputer, illustrated in FIG. 1.

The example illustrated in FIG. 4 indicates a state where, at the time point t1, the count value of the second timer counter 32 is two behind from the count value of the first timer counter 22. In other words, if no measure is taken, the sub microcomputer 30 executes each reception process at the timing being delayed by 2 ms from the timing when the main microcomputer 20 executes each transmission process.

Therefore, the sub microcomputer 30 determines whether the count value of the second timer counter 32 is 0 when the chip select signal that is transmitted from the main microcomputer 20 is switched from the Hi level to the Lo level. If determining that the count value of the second timer counter 32 is not 0, the sub microcomputer 30 causes the count value to be counted up by two at next count-up timing such that the count value of the second timer counter 32 is advanced by one. On the other hand, if determining that the count value of the second timer counter 32 is 0, the sub microcomputer 30 normally counts up by one at the timing of a next count-up.

Specifically, in the example illustrated in FIG. 4, at the time point t2 when the chip select signal that is transmitted from the main microcomputer 20 is switched from the Hi level to the Lo level, the count value of the second timer counter 32 is 8. Accordingly, the sub microcomputer 30 causes the count value to be counted up by two at next count-up timing. In other words, the count value of the second timer counter 32 that is 8 at the time point t2 does not become 9 but becomes 0 at the next count-up timing. Further, the count value of the second timer counter 32 is counted up by one from count-up timing that is twice later from the time point t2.

Moreover, in the example illustrated in FIG. 4, at the time point t3 when the chip select signal that is transmitted from the main microcomputer 20 is switched from the Hi level to the Lo level, the count value of the second timer counter 32 is 9. Accordingly, the sub microcomputer 30 causes the count value to be counted up by two at next count-up timing. In other words, the count value of the second timer counter 32 that is 9 at the time point t3 does not become 0 but becomes 1 at the next count-up timing. Further, the count value of the second timer counter 32 is counted up by one from count-up timing that is twice later from the time point t3. It should be noted that in this manner, when the count value of the second timer counter 32 does not become 0 but becomes 1, the sub microcomputer 30 executes the reception process at timing when the count value becomes 1.

In addition, in the example illustrated in FIG. 4, at the time point t4 when the chip select signal that is transmitted from the main microcomputer 20 is switched from the Hi level to the Lo level, the count value of the second timer counter 32 is 0. Accordingly, the sub microcomputer 30 normally counts up at next count-up timing. In other words, at the time point t4, the first timer counter 22 of the main microcomputer 20 and the second timer counter 32 of the sub microcomputer 30 are synchronized.

As in the foregoing, in the vehicle display device 10, a chip select signal that is transmitted by the main microcomputer 20 to the sub microcomputer 30 is used to synchronize the first timer counter 22 of the main microcomputer 20 and the second timer counter 32 of the sub microcomputer 30. Accordingly, for example, no dedicated signal line is required to be added for synchronizing the first timer counter 22 and the second timer counter 32.

Moreover, as still another example of the operation of the vehicle display device 10 in the state where the first timer counter 22 of the main microcomputer 20 and the second timer counter 32 of the sub microcomputer 30 are not synchronized, the sub microcomputer 30 may determine either one of omitting a count-up once and performing a count-up one time more. In this example of the operation, the sub microcomputer 30 determines whether the count value of the second timer counter 32 is 0 when the chip select signal is switched from the Hi level to the Lo level. If determining that the count value of the second timer counter 32 is 0, the sub microcomputer 30 normally counts up by one at the timing of a next count-up. On the other hand, if determining that the count value of the second timer counter 32 is not 0, the sub microcomputer 30 further determines which one of omitting a count-up once and performing a count-up one time more causes the count value of the second timer counter 32 to approach 0.

Further, the sub microcomputer 30 executes either one of omitting a count-up once and performing a count-up one time more, which causes the count value of the second timer counter 32 to approach 0. As a result, the first timer counter 22 and the second timer counter 32 can be synchronized earlier in the state where the first timer counter 22 and the second timer counter 32 are not synchronized, than in a case where a count-up of the second timer counter 32 is omitted or a count-up thereof is performed one time more.

Moreover, as still another example of the operation of the vehicle display device 10 in the state where the first timer counter 22 of the main microcomputer 20 and the second timer counter 32 of the sub microcomputer 30 are not synchronized, when the chip select signal that is transmitted from the main microcomputer 20 is switched from the Hi level to the Lo level, the sub microcomputer 30 may instantly synchronize the second timer counter 32 with the first timer counter 22. In this example of the operation, the sub microcomputer 30 determines whether the count value of the second timer counter 32 is 0 when the chip select signal is switched from the Hi level to the Lo level. If determining that the count value of the second timer counter 32 is 0, the sub microcomputer 30 normally counts up by one at the timing of a next count-up. On the other hand, if determining that the count value of the second timer counter 32 is not 0, the sub microcomputer 30 causes the count value of the second timer counter 32 to be 1 at the next count-up timing.

As a result, the first timer counter 22 and the second timer counter 32 can be synchronized earlier in the state where the first timer counter 22 and the second timer counter 32 are not synchronized, than in a case where a count-up of the second timer counter 32 is omitted or a count-up thereof is performed one time more.

In contrast to this, in the state where the first timer counter 22 and the second timer counter 32 are not synchronized, when a count-up of the second timer counter 32 is omitted once or a count-up thereof is performed one time more, a reduced influence on operations other than the reception process by the sub microcomputer 30 can be expected. Accordingly, in the state where the first timer counter 22 and the second timer counter 32 are not synchronized, the vehicle display device 10 may select an operation of omitting a count-up of the second timer counter 32 once or performing a count-up thereof one time more, or an operation of instantly synchronizing the second timer counter 32 with the first timer counter 22, in accordance with a status of the vehicle display device 10.

For example, when the vehicle display device 10 or the sub microcomputer 30 is started, in transition and the like from a sleep state to a wakeup state of the vehicle display device 10 or the sub microcomputer 30, the sub microcomputer 30 may instantly synchronize the second timer counter 32 with the first timer counter 22 in response to the chip select signal being switched from the Hi level to the Lo level. In other words, it is assumed that the sub microcomputer 30 does not perform a complicated operation when the vehicle display device 10 or the sub microcomputer 30 is started, in transition and the like from a sleep state to a wakeup state of the vehicle display device 10 or the sub microcomputer 30. Accordingly, it is assumed that a reduced influence is acted on operations other than the reception process by the sub microcomputer 30 when the vehicle display device 10 or the sub microcomputer 30 is started, in transition and the like from a sleep state to a wakeup state of the vehicle display device 10 or the sub microcomputer 30, even if the second timer counter 32 is instantly synchronized with the first timer counter 22. At this time, the main microcomputer 20 may perform only transmission of a chip select signal without executing the transmission process. In other words, the main microcomputer 20 may execute the transmission process after the first timer counter 22 and the second timer counter 32 have been synchronized.

Moreover, for example, after the sufficiently time has elapsed from the start of the vehicle display device 10, by considering an influence on operations other than the reception process by the sub microcomputer 30, in the state where the first timer counter 22 and the second timer counter 32 are not synchronized, the vehicle display device 10 may execute an operation of omitting a count-up of the second timer counter 32 once or performing a count-up thereof one time more.

Moreover, in at least one of the examples described above of the operation of the vehicle display device 10 in the state where the first timer counter 22 of the main microcomputer 20 and the second timer counter 32 of the sub microcomputer 30 are not synchronized, counter values of the first timer counter 22 and the second timer counter 32 may be counted down in response to a clock signal. Moreover, in at least one of the examples described above of the operation of the vehicle display device 10 in the state where the first timer counter 22 of the main microcomputer 20 and the second timer counter 32 of the sub microcomputer 30 are not synchronized, the first timer counter 22 of the main microcomputer 20 and the second timer counter 32 of the sub microcomputer 30 may be synchronized in accordance with the chip select signal being switched from the Lo level to the Hi level.

In addition, in at least one of the examples described above of the operation of the vehicle display device 10 in the state where the first timer counter 22 of the main microcomputer 20 and the second timer counter 32 of the sub microcomputer 30 are not synchronized, the timing when the main microcomputer 20 switches the chip select signal from the Hi level to the Lo level or the timing when the main microcomputer 20 switches the chip select signal from the Lo level to the Hi level is not limited to the timing when the count value of the first timer counter 22 becomes 0. In this case, for example, information indicating a current count value of the first timer counter 22 is included in the chip select signal to allow the sub microcomputer 30 to preferably grasp the current count value of the first timer counter 22.

However, the main microcomputer 20 does not switch the chip select signal from the Lo level to the Hi level while the main microcomputer 20 is executing the transmission process. In other words, during when the chip select signal is at the Hi level, it is impossible to transmit data from the main microcomputer 20 to the sub microcomputer 30.

Here, if the timing when the chip select signal is switched from the Hi level to the Lo level or the timing when the chip select signal is switched from the Lo level to the Hi level is the timing when the count value of the first timer counter 22 becomes 0, the sub microcomputer 30 can grasp a time lag between a start time point of the transmission process by the main microcomputer 20 and a start time point of the reception process by the sub microcomputer 30. In other words, the count value of the second timer counter 32 at the timing when the chip select signal is switched from the Hi level to the Lo level or at the timing when the chip select signal is switched from the Lo level to the Hi level indicates a time lag between the start time point of the transmission process by the main microcomputer 20 and the start time point of the reception process by the sub microcomputer 30. As a result, the sub microcomputer 30 can directly resolve the time lag between the start time point of the transmission process by the main microcomputer 20 and the start time point of the reception process by the sub microcomputer 30.

In the embodiment having been explained in the foregoing, it has been explained as the SPI communication method being used for the communication between the main microcomputer 20 and the sub microcomputer 30, however, the communication between the main microcomputer 20 and the sub microcomputer 30 is not limited to the SPI communication method. In other words, it is only required to connect at least, a signal line for transmission of information data, and, separately from this signal line, a signal line for transmission of a chip select signal, between the main microcomputer 20 and the sub microcomputer 30, and to allow communication between the main microcomputer 20 and the sub microcomputer 30.

The invention is not limited to the abovementioned exemplary embodiment, and persons skilled in the art could easily change the abovementioned exemplary embodiment in a range within the scope of the claims.

INDUSTRIAL APPLICABILITY

The invention is preferable to a vehicle display device that is mounted on a vehicle.

REFERENCE SIGNS LIST

10 . . . vehicle display device, 20 . . . main microcomputer, 21 . . . processing unit of main microcomputer, 22 . . . first timer counter, 23 . . . storage unit of main microcomputer, 24 . . . SPI communication unit of main microcomputer, 25 . . . input-output port of main microcomputer, 30 . . . sub microcomputer (GDC), 31 . . . processing unit of sub microcomputer, 32 . . . second timer counter, 33 . . . storage unit of sub microcomputer, 34 . . . SPI communication unit of sub microcomputer, 35 . . . input-output port of sub microcomputer, 40 . . . display element, 50 . . . communication line.

The invention claimed is:

1. A vehicle display device comprising:
a main microcomputer that generates information data, the main computer including a first timer;
a sub microcomputer that generates an image to be displayed on a display element on the basis of the information data, the sub microcomputer including a second timer;
a first signal line through which the main microcomputer transmits the information data to the sub microcomputer; and
a second signal line through which the main microcomputer transmits a chip select signal for selecting a transmission destination of the information data to the sub microcomputer, wherein
the main microcomputer executes a transmission process for transmitting the information data to the sub microcomputer based on a first count of the first timer of the main microcomputer,
the sub microcomputer executes a reception process for receiving the information data from the main microcomputer based on a second count of the second timer of the sub microcomputer,
when a count value of the first timer becomes a prescribed value, the main microcomputer switches a level of the chip select signal to be transmitted to the sub microcomputer from a Lo level to a Hi level or from the Hi level to the Lo level, and
the sub microcomputer synchronizes the second timer with the first timer in response to switching from the Lo level to the Hi level or from the Hi level to the Lo level of the chip select signal.

2. The vehicle display device according to claim 1, wherein
when the level of the chip select signal is switched from the Lo level to the Hi level or from the Hi level to the Lo level, the sub microcomputer determines whether a count value of the second timer matches the count value of the first timer, and
when determining that the count value of the second timer counter does not match the count value of the first timer counter, the sub microcomputer counts the count value of the second timer counter by one more or by one less.

3. The vehicle display device according to claim 2, wherein the sub microcomputer counts, when determining that the count value of the second timer counter does not match the count value of the first timer counter, the count value of the second timer counter by one more or by one less so as to approach the count value of the first timer counter.

4. The vehicle display device according to claim 1, wherein
when the level of the chip select signal is switched from the Lo level to the Hi level or from the Hi level to the Lo level, the sub microcomputer determines whether a count value of the second timer matches the count value of the first timer, and
when determining that the count value of the second timer counter does not match the count value of the first timer counter, the sub microcomputer causes the count value of the second timer counter to instantly match the count value of the first timer counter.

5. The vehicle display device according to claim 1, wherein the communication between the main microcomputer and the sub microcomputer is communication by a serial peripheral interface (SPI) communication method.

6. The vehicle display device according to claim 2, wherein the communication between the main microcomputer and the sub microcomputer is communication by a serial peripheral interface (SPI) communication method.

7. The vehicle display device according to claim 3, wherein the communication between the main microcomputer and the sub microcomputer is communication by a serial peripheral interface (SPI) communication method.

8. The vehicle display device according to claim 4, wherein the communication between the main microcomputer and the sub microcomputer is communication by a serial peripheral interface (SPI) communication method.

9. The vehicle display device according to claim 1, wherein
the sub microcomputer prioritizes processes to be executed by the sub microcomputer, and
the main microcomputer does not prioritize processes to be executed by the main microcomputer.

10. The vehicle display device according to claim 1, wherein the main computer switches the level of the chip select signal regardless of the execution of the transmission process for transmitting the information data to the sub microcomputer.

11. The vehicle display device according to claim 1, wherein the sub microcomputer synchronizes the second timer with the first timer when 1) the sub microcomputer changes from a sleep state to a awake state and 2) the main microcomputer switches the level of the chip select signal from a Lo level to a Hi level or from the Hi level to the Lo level.

* * * * *